United States Patent
Okada

(10) Patent No.: US 6,504,130 B1
(45) Date of Patent: Jan. 7, 2003

(54) LASER CUTTING METHOD

(75) Inventor: Takeshi Okada, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 114 days.

(21) Appl. No.: 09/656,760

(22) Filed: Sep. 7, 2000

(30) Foreign Application Priority Data

Oct. 22, 1999 (JP) .......................................... 11-301068

(51) Int. Cl.$^7$ ............................................. B23K 26/00
(52) U.S. Cl. ................................................ 219/121.72
(58) Field of Search ....................... 219/121.65, 121.66, 219/121.67, 121.7, 121.71, 121.72, 121.85

(56) References Cited

U.S. PATENT DOCUMENTS 5,777,807 A * 7/1998 Bar et al. ................... 359/845
5,889,256 A * 3/1999 Osanai ................... 219/121.74

FOREIGN PATENT DOCUMENTS

| JP | 51-115842 | 10/1976 |
| JP | 05-249307 | 9/1993 |
| JP | 9-293915 | 11/1997 |

OTHER PUBLICATIONS

M. Geiger et al., $CO_2$ laser beam sawing of thick sheet metal with adaptive optics, Welding in the World, 1996, vol. 37, No. 1, pp. 5–11.

J. Takács et al., Advanced Laser Beam Cutting Using Adaptive Optics, ECLAT '96, 971–978.

* cited by examiner

*Primary Examiner*—Samuel M. Heinrich
(74) *Attorney, Agent, or Firm*—McDermott, Will & Emery

(57) ABSTRACT

A laser cutting method that offers a practically acceptable smooth cut surface without lowering the cutting speed. In this method, a laser beam machining device having a variable-curvature mirror assembly is used. The mirror assembly includes a mirror plate having a convex back side and a front reflecting surface, and a piezo-actuator for deforming the mirror plate to change the curvature of the reflecting surface. A laser beam is produced from the device so as to be reflected by the reflecting surface of the mirror plate and condensed at a focal point. The piezo-actuator is actuated to change the curvature of the reflecting surface, thereby oscillating the focal point along the optical axis of the laser beam at a frequency of between 150 Hz and 300 Hz and an amplitude of between ±0.5 mm and ±3 mm.

6 Claims, 5 Drawing Sheets

LASER CUTTING METHOD

BACKGROUND OF THE INVENTION

This invention relates to a method of melt-cutting workpieces using laser beams as a heat source and particularly to a method of cutting while keeping high cutting speed to provide a smooth cut surface.

In laser beam cutting, a workpiece is melted using laser beams along an intended area and a gas is blown against the workpiece to remove the melted portion.

In order to obtain a smooth cut surface, trials have been made to oscillate the focal point of laser beams in the direction of the optical axis (that is, the direction of the depth of cut), as disclosed in the following documents:
1) Takaes et.al., Advanced Laser Beam Cutting Using Adaptive Optics, ECLAT'96, pp971
2) M. Geiger, S. Schuberth and J. Hutfless, "$Co_2$ laser beam sawing of thick sheet metal with adaptive optics", Welding in the world/Le Soudage dans le Monte, Vol.37, No.1,5 (1966)

In an ordinary laser cutting in which continuously oscillated laser beams are shed on a workpiece with the focal point fixed, streaks are formed on the cut surface due to interaction between the beam feed speed (or cut speed) and the oxidation reaction between oxygen and iron at the cut point. The streaks determine the roughness of the cut surface. The thus formed streaks are arranged at irregular pitches or intervals and thus roughen the cut surface.

Pulse oscillated laser beams are also sometimes used for laser cutting. Pulse oscillated laser beams minimize the heat-affected layer, thus permitting more precise cutting. But the cut speed using such laser beams is less than half the speed when continuously oscillated laser beams are used.

We therefore thought of developing the method proposed in the above-mentioned documents. That is, we thought that it might be possible to obtain a smoother cut surface without lowering the cutting speed if a workpiece is cut using continuously oscillated laser beams while oscillating the focal point.

But depending upon the conditions as to how the focal point is oscillated, this method can even produce a contrary result.

In this respect, in documents 1) and 2), the focal point is oscillated at frequencies of up to 150 Hz and 100 Hz, respectively. But at frequencies less than 150 Hz, the cut surface smoothing effect is not sufficiently obtained. Rather, the cut surface may be even rougher than in case the focal point is not oscillated.

We have also found out that in order to obtain a smooth cut surface, the amplitude of focal point oscillation is also an important factor affecting roughness of the cut surface and that it is equally important to minimize blurring of the condensation spot (or increase in spot diameter). The present invention has been made on basis of these findings.

An object of the invention is to provide a laser cutting method that offers a smooth cut surface without lowering the cutting speed and increases the smoothness to a practically acceptable level.

SUMMARY OF THE INVENTION

According to the present invention, a workpiece is cut while oscillating the focal point of laser beam in the direction of optical axis. To achieve the effect (that is, improved cut surface quality) by oscillation of focal point sufficiently and securely, the oscillation frequency should be adjusted to a range from 150 Hz to 300 Hz and the oscillation amplitude adjusted to a range between ±0.5 mm and ±3 mm.

To make possible oscillation at such a high frequency, a piezo-actuator is used to resiliently deform the mirror plate to change the curvature of the reflecting surface of the mirror plate, thereby controlling the divergence angle of laser beam incident on a condensing lens.

Further, if the surface accuracy of the reflecting surface of the mirror plate resiliently deformed for focal point oscillation is poor, the condensation spot is blurred, the power density of the laser beam lowers, and the cutting speed lowers. Thus, blurring of the condensation spot is suppressed by using a variable-curvature mirror having a mirror plate having a thickness distribution on its back or one in which the thickness is thicker at the central side.

Besides, for laser beams, continuous oscillation beams are used.

As mentioned earlier, natural streaks created on the cut surface in ordinary laser cutting are arranged at irregular pitches. In contrast, if cutting is performed while oscillating the laser beam focal point in the optical axis direction, it is possible to forcibly form on the cut surface regular streaks corresponding to the driving pitch of the focal point. If the frequency of focal point oscillation is controlled so that the pitch of the streaks is finer than the pitch of natural streaks to produce regular, fine-pitched streaks, the surface roughness improves, so that the cut surface is smoothened. It was found out that if the frequency of focal point oscillation is within the range of 150 Hz–300 Hz, the effect of smoothening of the cut surface will appear markedly, and that the effect will be the maximum especially at around 200 Hz. It was also found out that for flattening of the cut surface, it is necessary to keep the oscillation width or amplitude of the focal point within the range of ±0.5 mm to ±3 mm.

Next, as a method of oscillating the laser beam focal point at high speed in the optical axis direction, it is the most practical to use a laser machining machine equipped with a variable-curvature mirror in the optics and control the divergence angle of the beams incident to the condensation lens. This is because a piezo-actuator for resiliently deforming the mirror plate of the variable-curvature mirror is an element allowing shrink/expand control at high speed.

In order to prevent blurring of the condensation spot, the reflecting surface of the mirror should have a surface accuracy of less than ¹⁄₁₀ of the wavelength. For $CO^2$ laser beams (wavelength: 10.6 μm), the reflecting surface accuracy has to be less than 1 μm. One effective way to meet these requirements is to convex the back of the mirror because such a mirror is deflected uniformly when pressure is applied to the center of the back by the actuator. Even after deformation, the reflecting surface accuracy can be kept at 1 μm or under.

As mentioned above, cutting speed using pulse laser beams is less than half the speed when continuous laser beams are used. Moreover, since the pulse oscillation frequency range substantially coincides with the focal point oscillation frequency range envisaged in the present invention (several tens of hertz to several hundreds of hertz), no expected advantages of the invention are sufficiently achievable with pulse oscillated laser beams. Thus, continuously oscillated laser beams are used.

Other features and objects of the present invention will become apparent from the following description made with reference to the accompanying drawings, in which:

DETAILED DESCRIPTION OF THE PREFERRED EMBODIMENT

Figure 5:
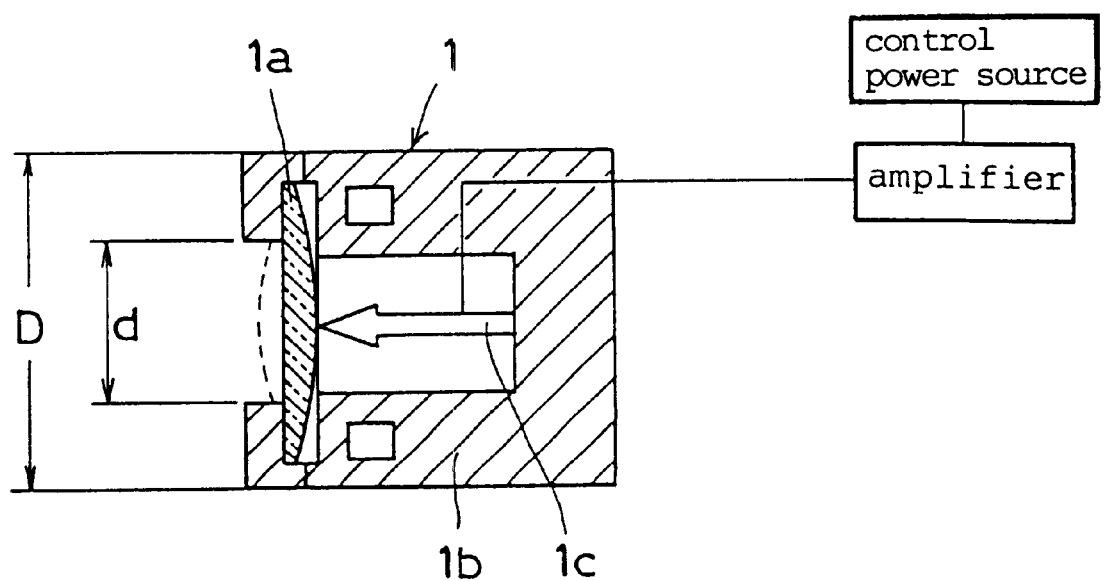
FIG. 5 is a schematic sectional view of a mirror assembly mounted in the device of FIG. 1.

Now the embodiment is described. A piezo-actuator-controlled variable-curvature mirror assembly 1 as shown in FIG. 5 was manufactured according to a reference ("Development of Adaptive Mirror for $C_2$ Laser" by Takeshi Okada et al. SEI Technical Review, No. 152, P183). The mirror assembly 1 comprises a mirror plate 1a supported on a mirror mount 1b, and a piezo-actuator 1c for deforming the mirror plate 1a by applying pressure. The following are the specifications of this assembly: mirror mount diameter D: 100 mm, reflecting surface diameter d: 62 mm, stroke of the piezo-actuator 1c: 30 μm, positioning accuracy: ±1 μm, shape of the reflecting surface of the mirror plate 1a when not pressed: flat, range of curvature of reflecting surface: infinity to convex 20 meters, effective diameter: 50 mm. In order that mirror plate 1a will form a highly precise spherical reflecting surface, its back is arcuately convex so that its thickness increases continuously toward the center. To minimize reflection loss, gold was deposited on the reflecting surface.

Figure 1:
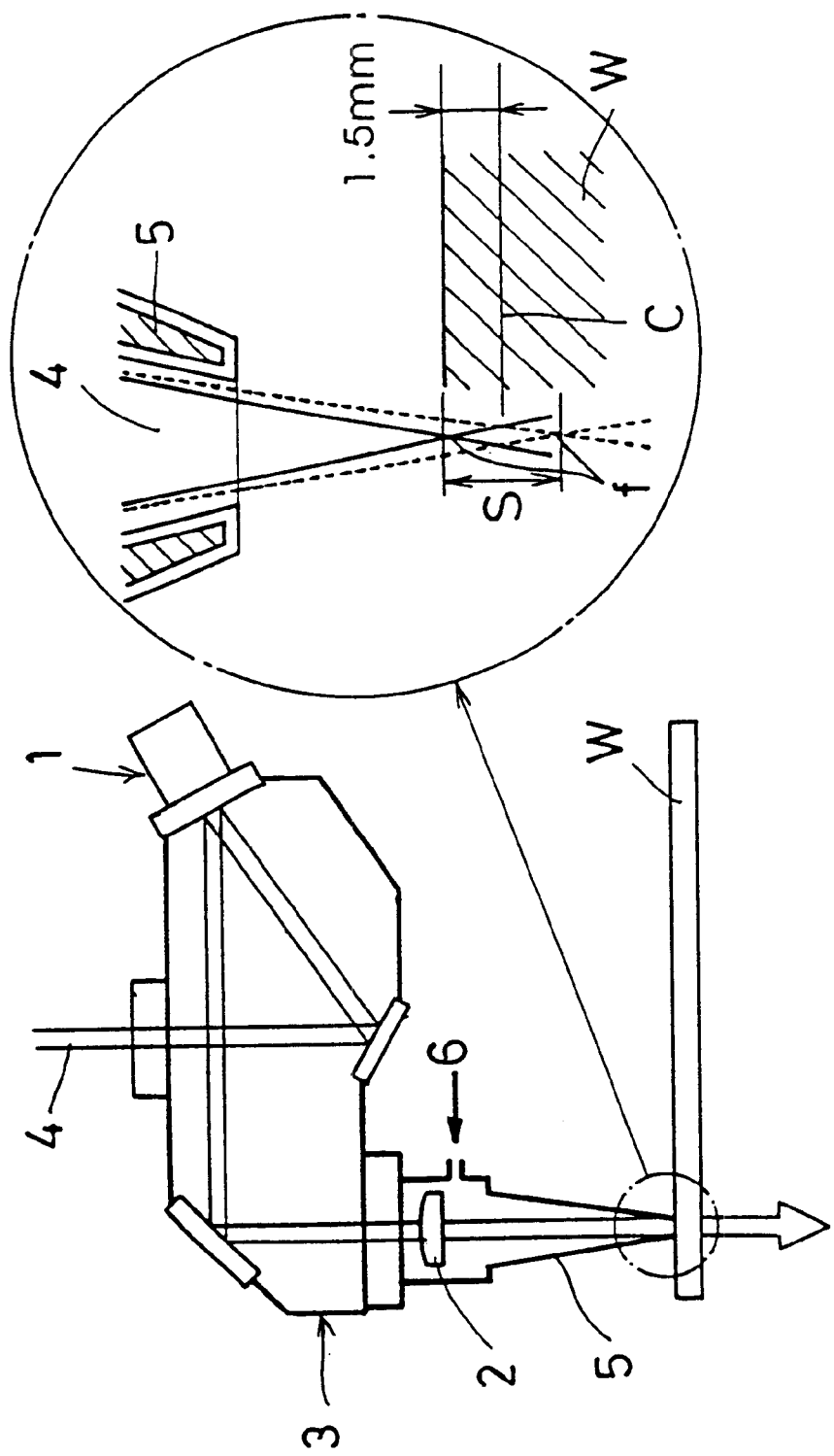
FIG. 1 is a view showing a laser beam machining device used for the method of the present invention with an optical system enlarged.

As shown in FIG. 1, the mirror assembly 1 of the above specifications was mounted on a machining head 3 of a $CO_2$ laser beam machining device in the optical path upstream of a condenser lens 2. The laser oscillator used in the machining device is not limited to a $CO_2$ laser oscillator but may be e.g. a YAG laser. Instead of the condenser lens 2, a parabolic mirror or any other known optical means may be used to condense laser beams.

Figure 2:
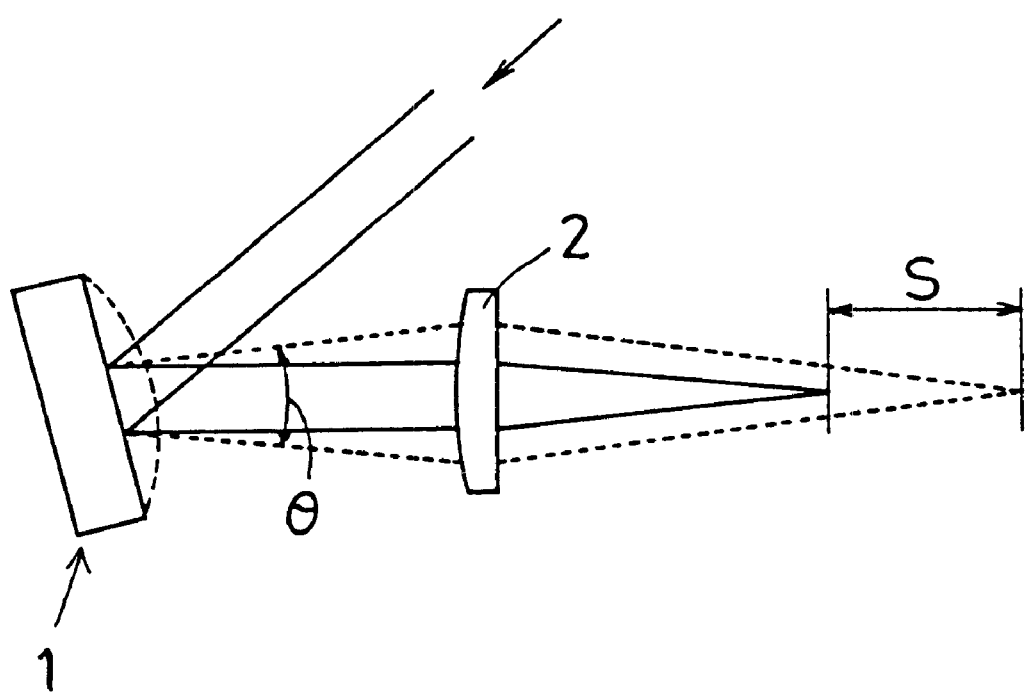
FIG. 2 is a view showing how the laser beam focal point is oscillated.

As shown in FIG. 2, by changing the curvature of the mirror plate 1a of the mirror assembly 1, it is possible to control the divergence angle θ of the laser beam 4 entering the condenser lens 2 and thereby move or oscillate the focal point f of the beam along the optical axis.

The method of the present invention was carried out using this laser beam machining device. The beam conditions were Cw, output 1 kw, Gauss mode. The workpiece W used was a mild steel plate 6 mm thick.

Figure 3:
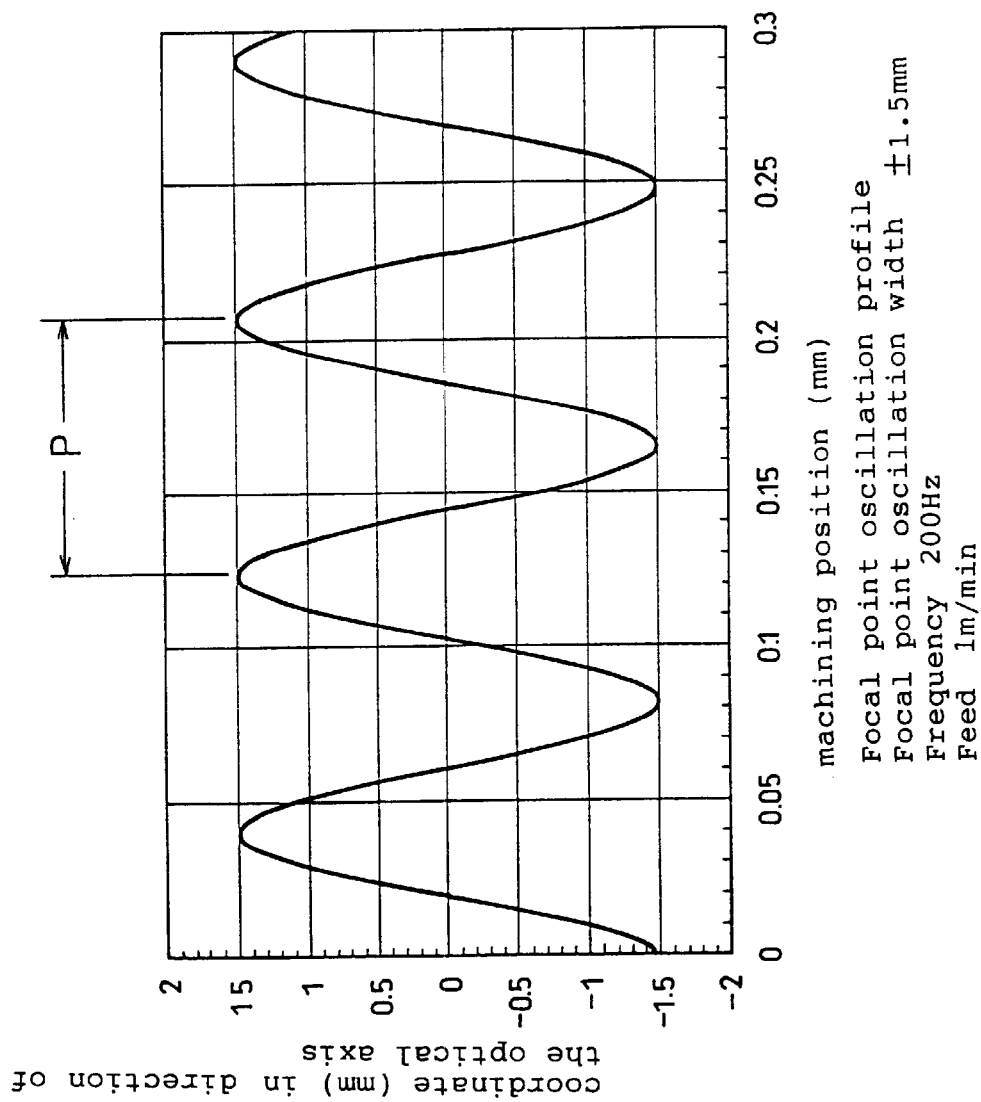
FIG. 3 is a graph showing a typical focal point oscillation curve.

The condenser lens had a focal distance of 7.5 inches (190.5 mm). The mirror plate la was controlled to oscillate the focal point at an amplitude of ±1.5 mm (amplitude S in FIG. 1=3 mm) with a sine wave as the oscillation waveform. FIG. 3 shows the focal point oscillation profile.

The center C of oscillation was set at a depth of 1.5 mm from the surface of the workpiece W. The workpiece W was fed at a speed of 1 meter per minute. The focal point thus oscillates in a sinewave as shown in FIG. 3.

Cutting was carried out while blowing an assist gas 6 through a nozzle 5 of the machining head 3 against the workpiece W along the cut-line. The assist gas 6 used was oxygen pressured to 1.4 kgf/cm² (1.372 Pa), as with the conventional laser cutting.

Figure 4:
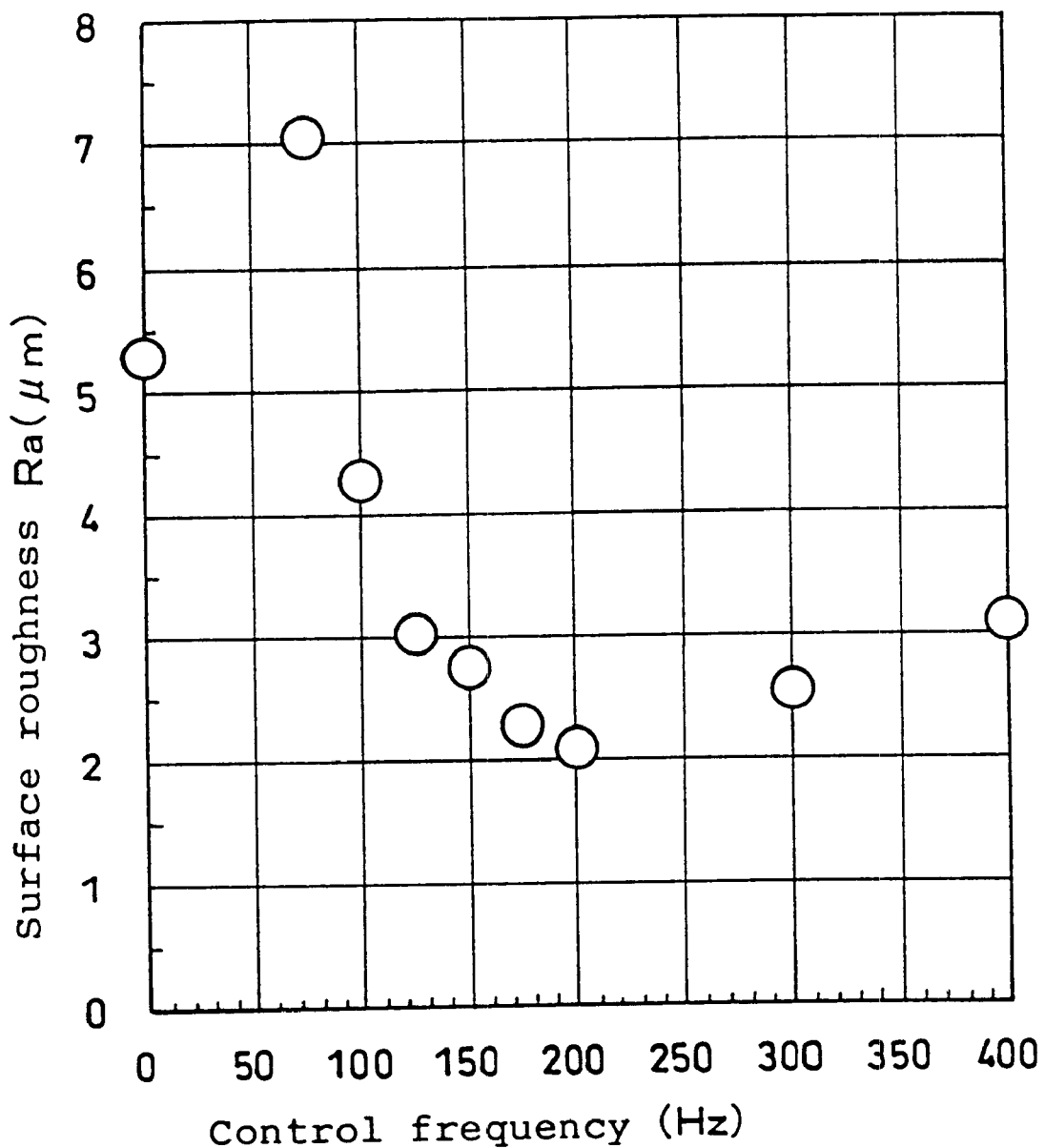
FIG. 4 is a graph showing the relationship between the focal point oscillation frequency and the roughness of the cut surface.

FIG. 4 shows the relationship between the surface roughness of the cut surface and the frequency of focal point oscillation. The surface roughness value shown is the average of values measured at three points spaced 1 mm, 3 mm and 5 mm from the top of the cut surface. As shown from FIG. 4, the effect of smoothening the cut surface is remarkable at frequency of 150–300 Hz, and the most remarkable at a frequency of 200 Hz. That is, at frequency of 200 Hz, the roughness Ra decreased to about Ra 2 μm from Ra 6 μm at zero Hz (focal point not oscillated). If the frequency is within the range of 200 Hz to 300 Hz, smooth cut surface can be obtained more stably even if the frequency conditions fluctuate slightly. In the frequency range below 100 Hz, no improvement in surface roughness was observed. Rather, the surface roughness worsened in this region. In the frequency range higher than 400 Hz, the surface roughness was practically the same as at zero Hz.

Also, even if the focal point oscillation frequency was within the range of 150–300 Hz, no improvement in the surface roughness was observed when the focal point oscillation amplitude from the center C of oscillation was less than ±0.5 mm or over ±3 mm. Thus, in order to achieve the purpose of the present invention, it is important that the focal point oscillation amplitude S in FIG. 1 be within the range of ±0.5 mm to ±3 mm.

A cutting test was conducted using pulse oscillated laser beams under the above-described conditions. But no good effect was achieved.

Similar good results can be achieved for a workpiece made from a material other than mild steel.

In the present invention, it is necessary to use a laser beam machining device capable of oscillating the focal point at a high frequency. Also, such a device has to be capable of suppressing blurring of the condensation spot.

By cutting with the oscillation frequency and amplitude set within specific ranges mentioned above, fine streaks are formed at regular and small pitches. The cut surface is thus smooth as a whole. Since continuously oscillated laser beams are used, drop in the cutting speed is prevented.

What is claimed is:

1. A method of cutting a workpiece, the method comprising shedding a laser beam from a laser beam machining device on the workpiece while oscillating said focal point along the optical axis of the laser beam at a frequency of between 150 Hz and 300 Hz and an amplitude of between +0.5 mm and +3 mm, wherein a variable-curvature mirror assembly comprising a mirror plate having a reflecting surface is provided along the optical path of said laser beam machining device and said laser beam is reflected by said reflecting surface of said mirror plate and condensed at a focal point, and wherein said mirror plate is elastically deformed by a piezo-actuator to change the curvature of said reflecting surface of said mirror plate, thereby oscillating the focal point.

2. The method of cutting a workpiece according to claim 1, wherein the mirror plate has a convex back side and a reflecting surface, and a piezo-actuator for elastically deforming said mirror plate to change the curvature of said reflective surface.

3. The method according to claim 1 wherein said laser beam is a continuously oscillated laser beam.

4. A method of cutting a workpiece, the method comprising shedding a laser beam from a laser beam machining device on the workpiece while oscillating said focal point along the optical axis of the laser beam at a frequency of between 175 Hz and 250 Hz and an amplitude of between +0.5 mm and +3 mm, wherein a variable-curvature mirror assembly comprising a mirror plate having a reflecting surface is provided along the optical path of said laser beam machining device and said laser beam is reflected by said reflecting surface of said mirror plate and condensed at a focal point, and wherein said mirror plate is elastically deformed by a piezo-actuator to change the curvature of said reflecting surface of said mirror plate, thereby oscillating the focal point.

5. The method of cutting a workpiece according to claim 4, wherein the mirror plate has a convex back side and a reflecting surface, and a piezo-actuator for elastically deforming said mirror plate to change the curvature of said reflective surface.

6. The method according to claim 4, wherein said laser beam is a continuously oscillated laser beam.

* * * * *